United States Patent
Hori

(10) Patent No.: US 11,361,674 B2
(45) Date of Patent: Jun. 14, 2022

(54) ENCOURAGING SPEECH SYSTEM, ENCOURAGING SPEECH METHOD, AND COMPUTER READABLE MEDIUM

(71) Applicant: Toyota Jidosha Kabushiki Kaisha, Toyota (JP)

(72) Inventor: Tatsuro Hori, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 213 days.

(21) Appl. No.: 16/749,148

(22) Filed: Jan. 22, 2020

(65) Prior Publication Data

US 2020/0242966 A1 Jul. 30, 2020

(30) Foreign Application Priority Data

Jan. 24, 2019 (JP) .............................. JP2019-010050

(51) Int. Cl.

| | |
|---|---|
| *G10L 15/22* | (2006.01) |
| *G10L 25/63* | (2013.01) |
| *G10L 25/78* | (2013.01) |
| *G10L 15/30* | (2013.01) |
| *G10L 13/00* | (2006.01) |
| *G09B 19/04* | (2006.01) |

(52) U.S. Cl.
CPC .............. *G09B 19/04* (2013.01); *G10L 13/00* (2013.01); *G10L 15/22* (2013.01); *G10L 15/30* (2013.01); *G10L 25/63* (2013.01); *G10L 25/78* (2013.01); *G10L 2015/227* (2013.01)

(58) Field of Classification Search
CPC ....................................................... G10L 13/00
See application file for complete search history.

(56) References Cited

U.S. PATENT DOCUMENTS

| 9,009,082 | B1 * | 4/2015 | Marshall ............ G06Q 30/0601 |
| | | | 705/26.1 |
| 9,336,268 | B1 * | 5/2016 | Moudy ............. G06F 16/24578 |
| 10,147,424 | B1 * | 12/2018 | Indyk ...................... G10L 15/22 |
| 10,984,794 | B1 * | 4/2021 | Kaneko .................. G06F 16/00 |

(Continued)

FOREIGN PATENT DOCUMENTS

| CN | 107888653 A | * | 4/2018 | ........ B60W 50/0098 |
| JP | 2015-219583 A | | 12/2015 | |
| WO | 2017/168465 A1 | | 10/2017 | |

*Primary Examiner* — Paras D Shah

(74) *Attorney, Agent, or Firm* — Dinsmore & Shohl LLP

(57) ABSTRACT

An encouraging speech system includes: at least one of reaction detection means for detecting a user's reaction in response to an encouraging speech and evaluation acquisition means for acquiring an evaluation by an evaluator on a timing and a content of the encouraging speech; good/bad determination means for determining whether the timing and the content of the encouraging speech are good or not based on at least one of the detected reaction and the acquired evaluation; learning means for learning learning data in which the timing and the content of the encouraging speech determined to be good by the good/bad determination means are associated with trigger information which serves as a trigger when this encouraging speech is made; and encouraging speech means for making the encouraging speech based on the trigger information by the user and the results of the learning by the learning means.

8 Claims, 5 Drawing Sheets

(56) References Cited

U.S. PATENT DOCUMENTS

2016/0180252 A1\* 6/2016 Yoshizumi ............... G06N 5/00
                                                706/12
2018/0090137 A1\* 3/2018 Horling ............... G06F 16/9535
2018/0329998 A1\* 11/2018 Thomson ......... H04N 21/41407
2019/0118887 A1 4/2019 Kinuhata et al.
2020/0167667 A1\* 5/2020 Rakshit .................. H04L 69/28

\* cited by examiner

ENCOURAGING SPEECH SYSTEM, ENCOURAGING SPEECH METHOD, AND COMPUTER READABLE MEDIUM

CROSS REFERENCE TO RELATED APPLICATIONS

This application is based upon and claims the benefit of priority from Japanese patent application No. 2019-010050, filed on Jan. 24, 2019, the disclosure of which is incorporated herein in its entirety by reference.

BACKGROUND

The present disclosure relates to an encouraging speech system, an encouraging speech method, and a program for making a speech for encouraging a user's action.

A speech system for recognizing a user's voice and making a response based on results of the recognition has been known (see, for example, Japanese Unexamined Patent Application Publication No. 2015-219583).

SUMMARY

The above speech system makes a response based on only language information. Therefore, when the response timing is not appropriate in view of, for example, a user's schedule, a time zone, a user's state and so on, the encouraging speech may annoy the user.

The present disclosure has been made in order to solve the aforementioned problem, and aims to provide an encouraging speech system, an encouraging speech method, and a program capable of making an encouraging speech at an appropriate timing and increasing an amount of activity of the user.

One aspect of the present disclosure in order to accomplish the aforementioned object is an encouraging speech system for performing an encouraging speech for encouraging a user's action in relation to nursing care or medical care of the user, the encouraging speech system including: at least one of reaction detection means for detecting a user's reaction in response to the encouraging speech and evaluation acquisition means for acquiring an evaluation by an evaluator on a timing and a content of the encouraging speech; good/bad determination means for determining whether the timing and the content of the encouraging speech are good or not based on at least one of the reaction detected by the reaction detection means and the evaluation acquired by the evaluation acquisition means; learning means for learning learning data in which the timing and the content of the encouraging speech determined to be good by the good/bad determination means are associated with trigger information which serves as a trigger when this encouraging speech is made; and encouraging speech means for making the encouraging speech based on the trigger information by the user and the results of the learning by the learning means.

In this aspect, in the learning data, the trigger information, and the timing and the content of the encouraging speech associated with the trigger information may be set based on the user's past action history.

In this aspect, the evaluation acquisition means may acquire an evaluation for each evaluator on the timing and the content of the encouraging speech, the good/bad determination means may determine whether the timing and the content of the encouraging speech are good or not based on the evaluation for each evaluator acquired by the evaluation acquisition means, the learning means may learn, for each evaluator, learning data in which the timing and the content of the encouraging speech determined to be good by the good/bad determination means are associated with trigger information of this encouraging speech, and the encouraging speech means may make the encouraging speech based on the results of the learning for each evaluator by the learning means.

In this aspect, the encouraging speech system may further include change amount calculation means for calculating an amount of change in the user's action with respect to the encouraging speech made by the encouraging speech means; and evaluation means for evaluating the evaluator, who is the source of the learning data, based on the amount of change in the user's action calculated by the change amount calculation means.

In this aspect, the evaluation acquisition means may reduce, when an evaluation on the evaluator by the evaluation means becomes equal to or smaller than a predetermined value, a weighting coefficient for an evaluated value put by this evaluator.

In this aspect, the encouraging speech system may further include presenting means for presenting an evaluation of each evaluator by the evaluation means for the user.

One aspect of the present disclosure in order to accomplish the aforementioned object may be an encouraging speech method for performing an encouraging speech for encouraging a user's action in relation to nursing care or medical care of the user, the method including the steps of: performing at least one of detection of a user's reaction in response to the encouraging speech and acquisition of an evaluation made by an evaluator on a timing and a content of the encouraging speech; determining whether the timing and the content of the encouraging speech are good or not based on at least one of the detected reaction and the acquired evaluation; learning learning data in which the timing and the content of the encouraging speech determined to be good are associated with trigger information which serves as a trigger when this encouraging speech is made; and performing the encouraging speech based on the trigger information by the user and the results of the learning.

One aspect of the present disclosure in order to accomplish the aforementioned object may be a program for performing an encouraging speech for encouraging a user's action in relation to nursing care or medical care of the user, the program causing a computer to execute the following processing of: performing at least one of detection of a user's reaction in response to the encouraging speech and acquisition of an evaluation made by an evaluator on a timing and a content of the encouraging speech; determining whether the timing and the content of the encouraging speech are good or not based on at least one of the detected reaction and the acquired evaluation; learning learning data in which the timing and the content of the encouraging speech determined to be good are associated with trigger information which serves as a trigger when this encouraging speech is made; and performing the encouraging speech based on the trigger information by the user and the results of the learning.

According to the present disclosure, it is possible to provide an encouraging speech system, an encouraging speech method, and a program capable of performing an encouraging speech at an appropriate timing and increasing an amount of activity of the user.

The above and other objects, features and advantages of the present disclosure will become more fully understood

DETAILED DESCRIPTION

First Embodiment

Figure 1:
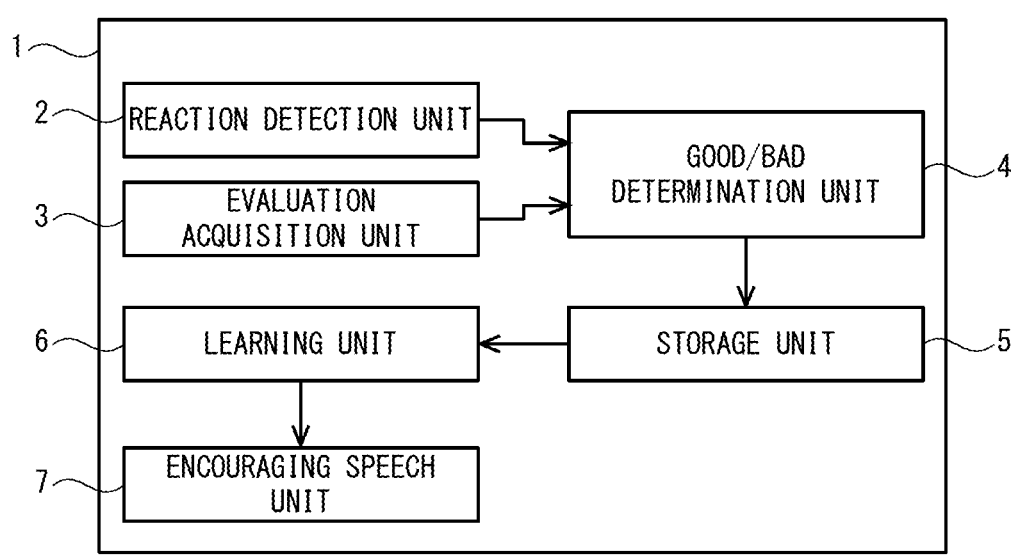
FIG. 1 is a block diagram showing a schematic system configuration of an encouraging speech system according to a first embodiment of the present disclosure.

Hereinafter, with reference to the drawings, embodiments of the present disclosure will be explained. FIG. 1 is a block diagram showing a schematic system configuration of an encouraging speech system according to a first embodiment of the present disclosure. An encouraging speech system 1 according to the first embodiment makes an encouraging speech for encouraging an action of a user in relation to nursing care or medical care of the user. It is therefore possible to encourage the user's action at an appropriate timing and to increase the amount of activity of the user, whereby it is possible, for example, to improve effects of rehabilitation by the user.

The user is a patient who stays in a medical facility (hospital etc.), a care receiver who stays in a nursing care facility or at home, an elderly person who lives in a nursing home. The encouraging speech system 1 makes an encouraging speech so as to increase the amount of activity of the user. For example, the encouraging speech system 1 makes an encouraging speech to allow the user to walk, go for a meal, visit another room, or go out. The encouraging speech system 1 is mounted on, for example, a robot, a Personal Computer (PC), or a mobile terminal (a smartphone, a tablet etc.), and makes a conversation with the user.

Incidentally, the speech system according to related art makes a response based on only language information. Therefore, when the response timing is not appropriate in view of, for example, a user's schedule, a time zone, a user's state and so on, the encouraging speech may annoy the user.

On the other hand, the encouraging speech system 1 according to the first embodiment determines whether the timing and the content of the encouraging speech are good or not using at least one of a user's reaction in response to the encouraging speech and an evaluated value by an evaluator on the encouraging speech. The encouraging speech system 1 performs learning using learning data in which the timing and the content of the encouraging speech have been determined to be good, and performs the encouraging speech based on the results of the learning. Accordingly, by performing the encouraging speech using the results of the learning in which the optimal timing and the optimal content of the encouraging speech are reflected, the encouraging speech can be made at an appropriate timing, and the amount of activity of the user can be increased.

The encouraging speech system 1 according to the first embodiment includes a reaction detection unit 2 configured to detect a user's reaction, an evaluation acquisition unit 3 configured to acquire the evaluated value on the encouraging speech by the evaluator, a good/bad determination unit 4 configured to determine whether the timing and the content of the encouraging speech are good or not, a storage unit 5 configured to store the encouraging speech in association with each other the results of the determination indicating whether the timing and the content are good or not, a learning unit 6 configured to learn the results of the determination indicating whether the timing and the content are good or not, and an encouraging speech unit 7 configured to perform the encouraging speech.

The encouraging speech system 1 may be formed by, for example, hardware mainly using a microcomputer including a Central Processing Unit (CPU) that performs arithmetic processing and so on, a memory that is composed of a Read Only Memory (ROM) and a Random Access Memory (RAM) and stores an arithmetic program executed by the CPU and the like, an interface unit (I/F) that externally receives and outputs signals, and so on. The CPU, the memory, and the interface unit are connected with one another through a data bus or the like.

The reaction detection unit 2 is one specific example of reaction detection means. The reaction detection unit 2 detects a user's reaction using, for example, a camera, a microphone, a Kinect sensor or the like. Further, the reaction detection unit 2 detects a user's reaction (an action or a state) in response to the encouraging speech output from the encouraging speech unit 7. The reaction detection unit 2 outputs the detected user's reaction to the good/bad determination unit 4.

The evaluation acquisition unit 3 is one specific example of evaluation acquisition means. The evaluation acquisition unit 3 acquires the evaluated value by the evaluator on the timing and the content of the encouraging speech. The evaluator actually observes, for example, a user's reaction in response to the encouraging speech and puts an evaluated value to the timing and the content of the encouraging speech. The evaluated value is indicated by, for example, the score from 1 to 5, and a high evaluated value means a high evaluation. The evaluated value, which may be good and bad (1 and 0), can be arbitrarily set. The evaluated values of the respective encouraging speeches are input to the evaluation acquisition unit 3 via an input apparatus or the like by the evaluator or the like every time the encouraging speech unit 7 makes an encouraging speech. The evaluated values of the respective encouraging speeches may be stored in the evaluation acquisition unit 3 in advance. The evaluation acquisition unit 3 outputs the acquired evaluated values by the evaluator to the good/bad determination unit 4.

The good/bad determination unit 4 is one specific example of good/bad determination means. The good/bad determination unit 4 determines whether the timing and the content of the encouraging speech are good or not. The good/bad determination unit 4 determines, based on the evaluated value of the encouraging speech acquired by the evaluation acquisition unit 3, whether the timing and the content of the encouraging speech are good or not. When, for example, the evaluated value of the encouraging speech acquired by the evaluation acquisition unit 3 is equal to or larger than a predetermined value (e.g., 4), the good/bad determination unit 4 determines the timing and the content of the encouraging speech to be good. Accordingly, it is possible to determine whether the timing and the content of the encouraging speech are good or not with a high accuracy using the evaluation made by the evaluator. The predetermined value is set in the good/bad determination unit 4 in advance, and the setting of the predetermined value may be arbitrarily changed by the user.

The good/bad determination unit 4 may determine, based on the user's reaction in response to the encouraging speech detected by the reaction detection unit 2, whether the timing and the content of the encouraging speech are good or not. When, for example, the user has made a positive reaction in response to the encouraging speech, the good/bad determination unit 4 may determine the timing and the content of the encouraging speech to be good. Accordingly, it is possible to automatically determine whether the timing and the content of the encouraging speech are good or not using the reaction detected by the reaction detection unit 2.

The positive reaction is, for example, a user's reaction including some action that corresponds to an encouraging speech, a user's nodding motion, or a positive speech or behavior (Yes etc.) More specifically, when the encouraging speech is "a speech for encouraging the user to walk", the positive reaction is that "the user actually walks".

The good/bad determination unit 4 may determine whether the timing and the content of the encouraging speech are good or not based on the user's reaction in response to the encouraging speech detected by the reaction detection unit 2 and the evaluated value of the encouraging speech acquired by the evaluation acquisition unit 3. When, for example, the evaluated value of the encouraging speech acquired by the evaluation acquisition unit 3 is equal to or larger than a predetermined value and the user has made a positive reaction in response to the encouraging speech, the good/bad determination unit 4 determines that the timing and the content of the encouraging speech are good. Therefore, it is possible to determine whether the timing and the content of the encouraging speech are good or not more accurately using the reaction by the reaction detection unit 2 and the evaluated value of the evaluator by the evaluation acquisition unit 3. The good/bad determination unit 4 outputs the timing and the content of the encouraging speech determined to be good to the storage unit 5 as results of the determination.

The storage unit 5 stores the timing and the content of the encouraging speech determined to be good by the good/bad determination unit 4 in association with trigger information which serves as a trigger for the encouraging speech as learning data. The storage unit 5 is formed of, for example, a memory.

Now, the trigger information will be explained in detail. The trigger information is information which serves as a trigger when the encouraging speech is made for the user.

The trigger information includes, for example, information such as a user's schedule, a user's state (the same posture, etc.), or a time zone. More specifically, the trigger information is that the user takes one posture (sitting posture, standing posture, bending posture, etc.) for at least a predetermined period of time. This trigger information is associated with an encouraging speech for encouraging the user to stand up or walk.

The trigger information is that the user has been lying down for at least a predetermined period of time and the time zone is daytime. This trigger information is associated with an encouraging speech for encouraging the user to wake up. The trigger information is that the user takes a posture that he/she has stopped for at least a predetermined period of time. This trigger information is associated with an encouraging speech for encouraging the user to walk. The schedule to wake up the user at every predetermined period of time (every 30 minutes) is set as the trigger information. This trigger information is associated with an encouraging speech for encouraging the user to wake up at every predetermined period of time. The schedule to cause the user to sit down, stand up, and then walk after waking up the user is set as the trigger information. This trigger information is associated with an encouraging speech for encouraging the user to sit down, stand up, and walk after waking up the user. The schedule to allow the user to sit down and walk after having a meal is set as the trigger information. This trigger information is associated with an encouraging speech for encouraging the user to sit down and walk for a predetermined period of time after having a meal.

The learning unit 6 is one specific example of learning means. The learning unit 6 performs learning using learning data stored in the storage unit 5. The learning unit 6 receives the trigger information, which triggers an encouraging speech, outputs the timing and the content of the encouraging speech, and learns a relationship between the trigger information and the timing and the content of the encouraging speech.

The aforementioned trigger information of the learning data, and the timing and the content of the encouraging speech associated with this trigger information may be set based on the user's past action history. Accordingly, the results of the learning in which the user's past action history is reflected can be obtained, and by making an encouraging speech using the results of the learning, the encouraging speech including the content optimal for the user can be made at the timing optimal for the user.

For example, the user is normally tired after doing some exercise. In this case, an encouraging speech for allowing the user to take a long break may be made in view of the action history such as the exercise history of the user. More specifically, the trigger information is a state after the user does some exercise. This trigger information is associated with the timing and the content of the encouraging speech for allowing the user to take a long break (an encouraging speech to wake up the user after a certain period of time).

When a predetermined period of time has passed after the user woke up, the user may be allowed to sit down. Therefore, the trigger information is a state in which a predetermined period of time has passed after the user woke up. This trigger information is associated with the timing and the content of the encouraging speech to allow the user to sit down.

The learning unit 6 is formed of, for example, a neural network such as a Recurrent neural Network (RNN). This RNN includes a Long Short Term Memory (LSTM) in its intermediate layer. The learning unit 6 may be formed of a learning apparatus such as a Support Vector Machine (SVM), which is other than the neural network.

The encouraging speech unit 7 is one specific example of encouraging speech means. The encouraging speech unit 7 makes an encouraging speech based on the results of the learning by the learning unit 6. The reaction detection unit 2 detects the trigger information of the user and outputs the detected trigger information to the learning unit 6. The learning unit 6 outputs the timing and the content of the encouraging speech in accordance with the input trigger information. The encouraging speech unit 7 makes an encouraging speech based on the timing and the content of the encouraging speech output from the learning unit 6. The encouraging speech unit 7 causes a speaker or the like to output the speech indicating the content of this encouraging speech at the timing of the encouraging speech output from the learning unit 6.

Figure 2:
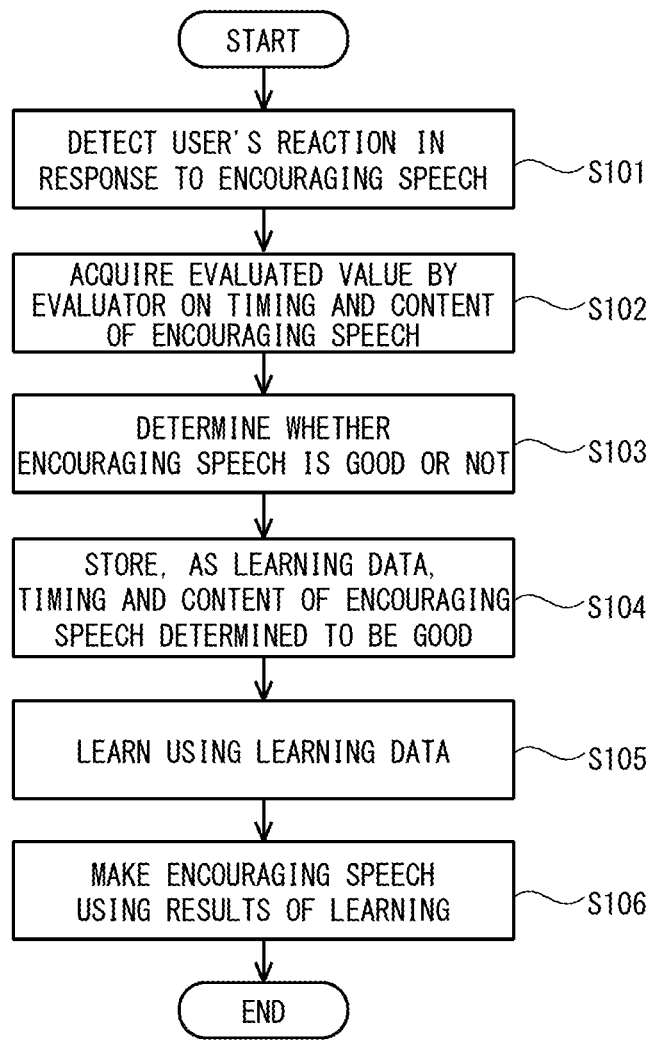
FIG. 2 is a flowchart showing a flow of an encouraging speech method according to the first embodiment of the present disclosure.

FIG. 2 is a flowchart showing a flow of an encouraging speech method according to the first embodiment. As described above, the encouraging speech system 1 according to the first embodiment of the present disclosure first learns learning data of the trigger information and the timing and the content of the encouraging speech at the <learning process>. After that, the encouraging speech system 1 makes an encouraging speech based on the results of the learning at the <encouraging speech process>.

<Learning Process>

The reaction detection unit 2 detects a user's reaction in response to the encouraging speech output from the encouraging speech unit 7 and outputs the detected user's reaction to the good/bad determination unit 4 (Step S101).

The evaluation acquisition unit 3 acquires the evaluated value by the evaluator on the timing and the content of the encouraging speech output from the encouraging speech unit 7, and outputs the acquired evaluated value of the encouraging speech by the evaluator to the good/bad determination unit 4 (Step S102).

The good/bad determination unit 4 determines whether the timing and the content of the encouraging speech are good or not based on the user's reaction in response to the encouraging speech detected by the reaction detection unit 2 and the evaluated value of the encouraging speech by the evaluator acquired by the evaluation acquisition unit 3 (Step S103). The good/bad determination unit 4 outputs the timing and the content of the encouraging speech determined to be good to the storage unit 5 as the results of the determination.

The storage unit 5 stores, as the learning data, the timing and the content of the encouraging speech determined to be good by the good/bad determination unit 4 and the trigger information of this encouraging speech in association with each other (Step S104).

The learning unit 6 receives the trigger information of the encouraging speech, outputs the timing and the content of the encouraging speech, and learns the relation between the trigger information and the timing and the content of the encouraging speech using the learning data stored in the storage unit 5 (Step S105). The above processing of the learning process is repeatedly executed, for example, at every predetermined period of time.

<Encouraging Speech Process>

The trigger information detected by the reaction detection unit 2 is input to the learning unit 6. The encouraging speech unit 7 makes an encouraging speech based on the timing and the content of the encouraging speech output from the learning unit 6 (results of the learning) (Step S106).

As described above, the encouraging speech system 1 according to the first embodiment includes at least one of the reaction detection unit 2 configured to detect the user's reaction in response to the encouraging speech and the evaluation acquisition unit 3 configured to acquire an evaluation by the evaluator on the timing and the content of the encouraging speech, the good/bad determination unit 4 configured to determine whether the timing and the content of the encouraging speech are good or not based on at least one of the reaction detected by the reaction detection unit 2 and the evaluation acquired by the evaluation acquisition unit 3, the learning unit 6 configured to learn the learning data in which the timing and the content of the encouraging speech determined to be good by the good/bad determination unit 4 are associated with the trigger information which serves as a trigger when this encouraging speech is made, and the encouraging speech unit 7 configured to make an encouraging speech based on the trigger information by the user and the results of the learning by the learning unit 6.

According to the above configuration, by performing the encouraging speech using the results of the learning in which the optimal timing and the optimal content of the encouraging speech are reflected, the encouraging speech can be made at an appropriate timing, and the amount of activity of the user can be increased.

Second Embodiment

Figure 3:
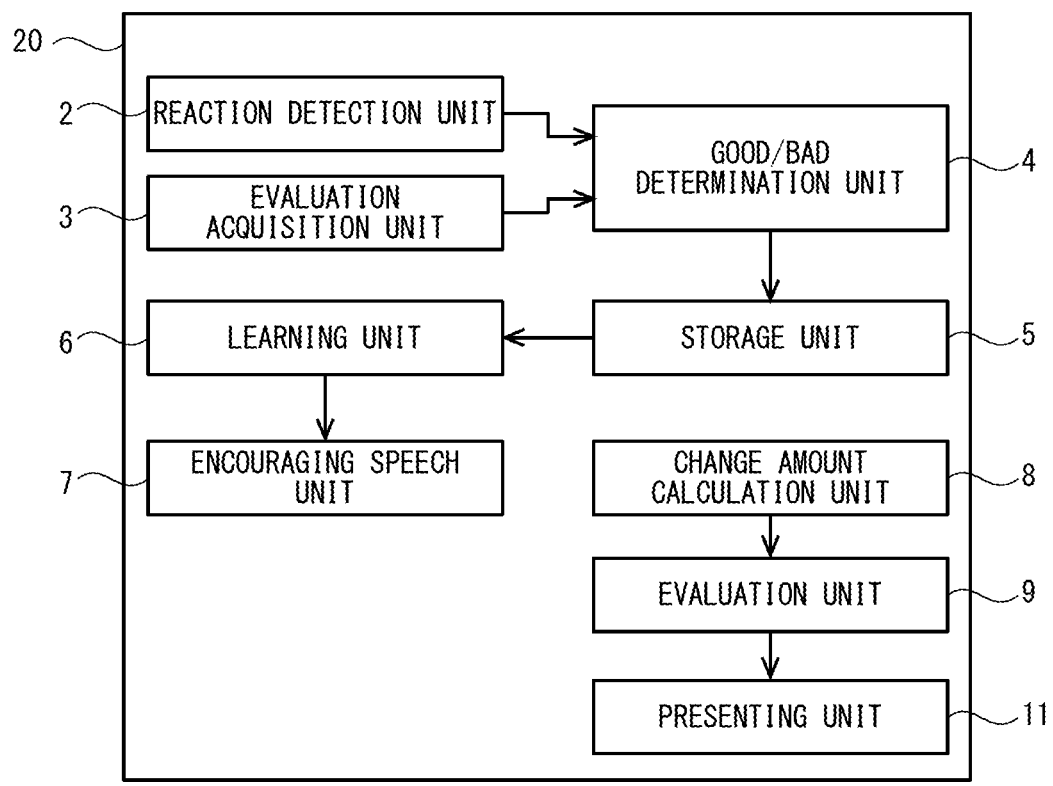
FIG. 3 is a block diagram showing a schematic system configuration of an encouraging speech system according to a second embodiment of the present disclosure.

FIG. 3 is a block diagram showing a schematic system configuration of an encouraging speech system according to a second embodiment of the present disclosure. An encouraging speech system 20 according to the second embodiment further includes, besides the components shown in the above first embodiment, a change amount calculation unit 8 configured to calculate an amount of change in the user's action, and an evaluation unit 9 configured to evaluate the evaluator.

By evaluating each of the evaluators, the obtained evaluation can be reflected in the learning data, whereby more accurate learning data can be generated. It is therefore possible to make an encouraging speech at a more appropriate timing and to further increase the amount of activity of the user.

The evaluation acquisition unit 3 acquires the evaluation for each evaluator on the timing and the content of the encouraging speech.

The good/bad determination unit 4 determines, based on the evaluation for each evaluator acquired by the evaluation acquisition unit 3, whether the timing and the content of the encouraging speech are good or not. The learning unit 6 learns, for each evaluator, the learning data in which the timing and the content of the encouraging speech determined to be good by the good/bad determination unit 4 and the trigger information of the encouraging speech are associated with each other.

The encouraging speech unit 7 makes an encouraging speech using the results of the learning for each evaluator performed by the learning unit 6. The change amount calculation unit 8 is one specific example of change amount calculation means. The change amount calculation unit 8 calculates the amount of change in the user's action amount based on the user's reaction detected by the reaction detection unit 2 after the encouraging speech.

The change amount calculation unit 8 may calculate, for example, the amount of change in the user's movement from before the encouraging speech as the amount of change in the user's action based on the user's reaction detected by the reaction detection unit 2 after the encouraging speech. Further, the change amount calculation unit 8 may calculate, based on the sensor value detected by a biometric sensor attached to the user, the amount of change such as the amount of activity of the user, the consumed calorie, or the number of steps from before the encouraging speech as the amount of change in the user's action. The biometric sensor is, for example, a heart rate meter, a pedometer or the like.

The evaluation unit is one specific example of evaluation means. The evaluation unit 9 evaluates the evaluator, who is the source of the learning data, based on the amount of change in the user's action calculated by the change amount calculation unit 8. The evaluation unit 9 gives, for example, the evaluated value to the evaluator in accordance with the amount of change in the user's action calculated by the change amount calculation unit 8. Higher evaluated values are given to the evaluator as the amount of change in the user's action increases. The evaluation unit 9 outputs the evaluated values given to the respective evaluators to the storage unit 5.

The encouraging speech system 20 according to the second embodiment may further include a presenting unit 11 configured to present the evaluated values given to the respective evaluators stored in the storage unit 5 for the user. The presenting unit 11 is one specific example of presenting means. The user refers to the evaluated values given to the respective evaluators presented for the presenting unit 11, and can generate more accurate learning data in view of, for example, the timing of the encouraging speech by the evaluator with a high evaluation. The presenting unit 11 is, for example, a display or a printer.

In this second embodiment, elements which are the same as those of the first embodiment are denoted by the same reference symbols as those of the first embodiment and the detailed descriptions thereof will be omitted.

Figure 4:
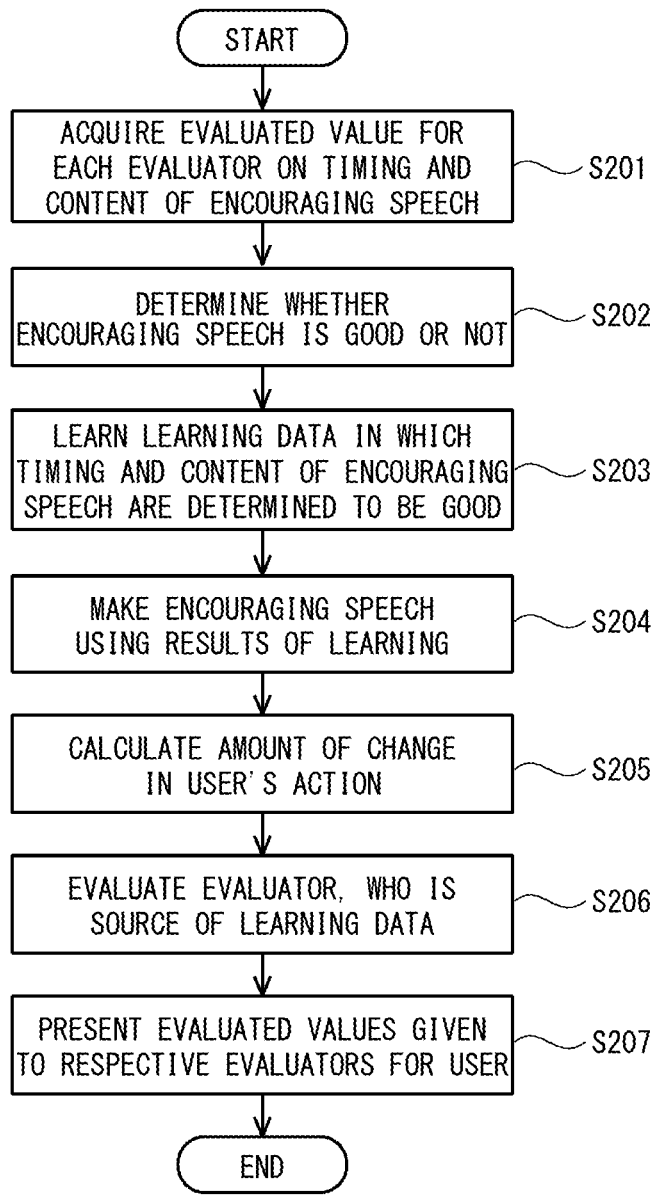
FIG. 4 is a flowchart showing an evaluation flow by the encouraging speech system according to the second embodiment of the present disclosure.

FIG. 4 is a flowchart showing an evaluation flow by the encouraging speech system according to the second embodiment of the present disclosure. The evaluation acquisition unit 3 acquires the evaluated value for each evaluator on the timing and the content of the encouraging speech (Step S201).

The good/bad determination unit 4 determines, based on the evaluated value for each evaluator acquired by the evaluation acquisition unit 3, whether the timing and the content of the encouraging speech are good or not (Step S202). The learning unit 6 learns, for each evaluator, the learning data in which the timing and the content of the encouraging speech determined to be good by the good/bad determination unit 4 and the trigger information of this encouraging speech are associated with each other (Step S203).

The encouraging speech unit 7 makes an encouraging speech using the results of the learning for each evaluator performed by the learning unit 6 (Step S204). The change amount calculation unit 8 calculates the amount of change in the user's action based on the user's reaction detected by the reaction detection unit 2 after the encouraging speech (Step S205).

The evaluation unit 9 evaluates the evaluator, who is the source of the learning data, based on the amount of change in the user's action calculated by the change amount calculation unit 8 (Step S206). The evaluation unit 9 outputs the evaluated values given to the respective evaluators to the storage unit 5. The presenting unit 11 presents the evaluated values given to the respective evaluators stored in the storage unit 5 for the user (Step S207).

Third Embodiment

In a third embodiment of the present disclosure, the evaluation acquisition unit 3 may weight the acquired evaluated value by the evaluator. The evaluation acquisition unit 3 weights, based on the evaluation on the evaluator by the evaluation unit 9, the evaluated value put by this evaluator. The evaluation acquisition unit 3 may reduce, when the evaluated value on the evaluator by the evaluation unit 9 is equal to or smaller than a predetermined value, a weighting coefficient on the evaluated value put by this evaluator. In this way, it is possible to reduce the influence of the evaluated value by the evaluator with a low evaluation and to generate more accurate learning data.

Note that, when the evaluated value of the evaluator by the evaluation unit 9 is equal to or larger than a predetermined value, the evaluation acquisition unit 3 may increase the weighting coefficient for the evaluation value put by this evaluator. The evaluation acquisition unit 3 may reduce, as the evaluated value of the evaluator by the evaluation unit 9 becomes lower, the weighting coefficient for the evaluated value put by this evaluator.

Assume a case, for example, in which evaluators A and B have respectively put evaluated values X and Y for the timing and the content of the encouraging speech. When the evaluated value for the evaluator A obtained by the evaluation unit 9 becomes equal to or smaller than three, the evaluation acquisition unit 3 reduces the weighting coefficient for the evaluated value X by the evaluator A from 0.5 to 0.3. On the other hand, when the evaluated value for the evaluator B by the evaluation unit 9 is larger than three, the evaluation acquisition unit 3 increases the weighting coefficient for the evaluated value Y by the evaluator B from 0.5 to 0.7.

The evaluation acquisition unit 3 performs calculation by changing the final evaluated value for the timing and the content of the encouraging speech from (0.5X+0.5Y) to (0.3X+0.7Y). In this way, the influence given by the evaluated value by the evaluator A with a low evaluation is reduced and the influence given by the evaluated value by the evaluator B with a high evaluation is increased, whereby the evaluated value for the timing and the content of the encouraging speech can be calculated.

The good/bad determination unit 4 is able to determine whether the timing and the content of the encouraging speech are good or not with a high accuracy based on the evaluated value in which the evaluation of the evaluator adjusted by the evaluation acquisition unit 3 is reflected. Therefore, more accurate learning results can be generated, and an encouraging speech is made using the results of the learning, whereby it is possible to make an encouraging speech whose content is optimal for the user at the timing optimal for the user.

In this third embodiment, elements which are the same as those of the first and second embodiments are denoted by the same reference symbols as those of the first and second embodiments and the detailed descriptions thereof will be omitted.

While some embodiments of this disclosure have been described above, these embodiments are presented as examples and not intended to limit the scope of the disclosure. These novel embodiments can be implemented in other various forms, and various types of omissions, substitutions, or changes can be made without departing from the spirit of the disclosure. These embodiments and their modifications, as would fall within the scope and spirit of the disclosure, are included in the disclosure provided in the claims and the scope of equivalents thereof.

While the reaction detection unit 2, the evaluation acquisition unit 3, the good/bad determination unit 4, the storage unit 5, the learning unit 6, and the encouraging speech unit 7 are integrally formed in the above first embodiment, this is merely one example. At least one of the evaluation acquisition unit 3, the good/bad determination unit 4, the storage unit 5, and the learning unit 6 may be provided in an external apparatus such as an external server.

Figure 5:
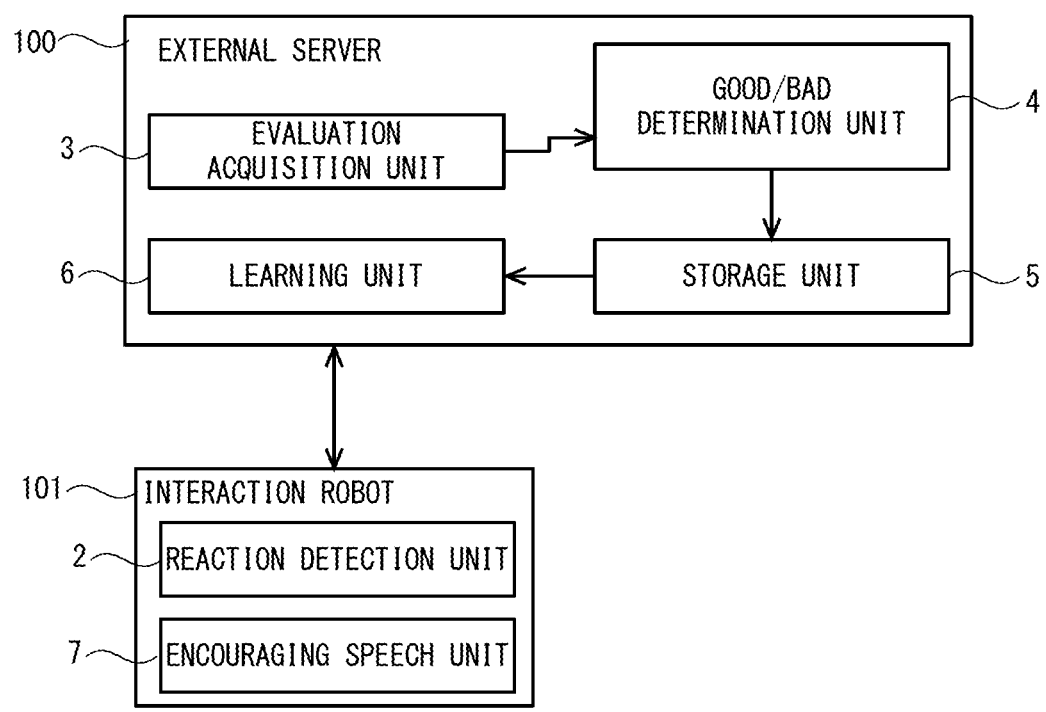
FIG. 5 is a diagram showing a configuration in which an evaluation acquisition unit, a good/bad determination unit, a storage unit, and a learning unit are provided in an external server.

For example, as shown in FIG. 5, the reaction detection unit 2 and the encouraging speech unit 7 are provided in the interaction robot 101, and the evaluation acquisition unit 3, the good/bad determination unit 4, the storage unit 5, and the learning unit 6 are provided in the external server 100. The communication between the interaction robot 101 and the external server 100 may be connected to each other via a communication network such as Long Term Evolution (LTE), and the interaction robot 101 and the external server 100 may communicate data with each other. In this way, the external server 100 and the interaction robot 101 may perform processing different from each other, whereby the amount of processing performed in the interaction robot 101 can be reduced and the size and the weight of the interaction robot 101 can also be reduced.

The present disclosure is able to achieve, for example, the processing shown in FIGS. 2 and 4 by causing a CPU to execute a computer program.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magnetooptical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.).

The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An encouraging speech system for performing an encouraging speech for encouraging a user's action in relation to nursing care or medical care of the user, the encouraging speech system comprising:
 a processor programmed to:
 obtain a user's reaction in response to the encouraging speech;
 acquire evaluations by a plurality of evaluators on a timing and a content of the encouraging speech, the plurality of evaluators outputting different evaluated values regarding the timing and the content of the encouraging speech by observing the user's reaction;
 determine whether the timing and the content of the encouraging speech are good or not based on a weighted sum of the evaluated values by the plurality of evaluators, wherein the weighted sum comprises a weight assigned to each evaluator based on a comparison of an evaluation accuracy for each evaluator to a threshold;
 learn, iteratively, using a neural network or a support vector machine, learning data based on the weighted sum of the evaluated values and the association of trigger information which serves as a trigger when speech is made; and
 instruct an output device to output the encouraging speech based on the trigger information by the user and results of the learning.

2. The encouraging speech system according to claim 1, wherein, in the learning data, the trigger information, and the timing and the content of the encouraging speech associated with the trigger information are set based on the user's past action history.

3. The encouraging speech system according to claim 1, wherein the processor is programmed to
 calculate an amount of change in the user's action with respect to the encouraging speech; and
 evaluate each of the plurality of evaluators, who is a source of the learning data, based on the amount of change in the user's action.

4. The encouraging speech system according to claim 3, wherein the processor is programmed to reduce, when an evaluation on one of the plurality of evaluators becomes equal to or smaller than a predetermined value, a weighting coefficient for an evaluated value put by the corresponding evaluator.

5. The encouraging speech system according to claim 3, wherein the processor is programmed to instruct the output device to present an evaluation of each evaluator for the user.

6. An encouraging speech method for performing an encouraging speech for encouraging a user's action in relation to nursing care or medical care of the user, the method comprising the steps of:
 obtaining a user's reaction in response to the encouraging speech;
 acquiring evaluations by a plurality of evaluators on a timing and a content of the encouraging speech, the plurality of evaluators outputting different evaluated values regarding the timing and the content of the encouraging speech by observing the user's reaction;
 determining whether the timing and the content of the encouraging speech are good or not based on a weighted sum of the evaluated values by the plurality of evaluators, wherein the weighted sum comprises a weight assigned to each evaluator based on a comparison of an evaluation accuracy for each evaluator to a threshold;
 learning, iteratively, using a neural network or a support vector machine, learning data based on the weighted sum of the evaluated values and the association of trigger information which serves as a trigger when speech is made; and
 instructing an output device to output the encouraging speech based on the trigger information by the user and results of the learning.

7. A non-transitory computer readable medium storing a program for performing an encouraging speech for encouraging a user's action in relation to nursing care or medical care of the user, the program causing a computer to execute the following processing of:
 obtaining a user's reaction in response to the encouraging speech;
 acquiring evaluations made by a plurality of evaluators on a timing and a content of the encouraging speech, the plurality of evaluators outputting different evaluated values regarding the timing and the content of the encouraging speech by observing the user's reaction;
 determining whether the timing and the content of the encouraging speech are good or not based on a weighted sum of the evaluated values by the plurality of evaluators, wherein the weighted sum comprises a weight assigned to each evaluator based on a comparison of an evaluation accuracy for each evaluator to a threshold;

learning, using a neural network or a support vector machine, learning data based on the weighted sum of the evaluated values and the association of trigger information which serves as a trigger when this encouraging speech is made; and instructing an output device to output the encouraging speech based on the trigger information by the user and results of the learning.

8. An encouraging speech system for performing an encouraging speech for encouraging a user's action in relation to nursing care or medical care of the user, the encouraging speech system comprising:

at least one of a camera, a microphone, and a Kinect sensor configured to obtain a user's reaction in response to the encouraging speech;

a processor programmed to:

acquire evaluations by a plurality of evaluators on a timing and a content of the encouraging speech, the plurality of evaluators outputting different evaluated values regarding the timing and the content of the encouraging speech by observing the user's reaction;

determine whether the timing and the content of the encouraging speech are good or not based on a weighted sum of evaluated values by the plurality of evaluators, wherein the weighted sum comprises a weight assigned to each evaluator based on a comparison of an evaluation accuracy for each evaluator to a threshold; and learn, using a neural network or a support vector machine, learning data based on the weighted sum of the evaluated values and the association of trigger information which serves as a trigger when this encouraging speech is made; and an encouraging speaker configured to make the encouraging speech based on the trigger information by the user and results of the learning by the learning unit.

* * * * *